United States Patent
Ghosh et al.

(10) Patent No.: US 12,052,389 B2
(45) Date of Patent: Jul. 30, 2024

(54) DIGITAL TWIN SIMULATION OF INTERACTIVE VOICE RESPONSE SYSTEM CALL

(71) Applicant: INTERNATIONAL BUSINESS MACHINES CORPORATION, Armonk, NY (US)

(72) Inventors: Partho Ghosh, Kolkata (IN); Girish Padmanabhan, Pune (IN); Soumitra Limaye, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 17/655,997

(22) Filed: Mar. 22, 2022

(65) Prior Publication Data
US 2023/0308544 A1    Sep. 28, 2023

(51) Int. Cl.
*H04M 1/64*     (2006.01)
*G10L 15/26*    (2006.01)
*H04M 3/493*    (2006.01)

(52) U.S. Cl.
CPC .......... *H04M 3/4938* (2013.01); *G10L 15/26* (2013.01)

(58) Field of Classification Search
CPC ............................. H04M 3/4938; G10L 15/26
See application file for complete search history.

(56) References Cited

U.S. PATENT DOCUMENTS

| | | | |
|---|---|---|---|
| 2008/0304639 A1* | 12/2008 | McDonough | H04M 3/493 379/93.01 |
| 2015/0172262 A1* | 6/2015 | Ortiz, Jr. | H04W 12/068 715/706 |
| 2015/0172463 A1* | 6/2015 | Quast | H04M 3/4936 379/88.01 |
| 2017/0244834 A1* | 8/2017 | Flores | H04M 3/42068 |
| 2019/0005200 A1 | 1/2019 | Zimmerman | |
| 2021/0136202 A1 | 5/2021 | Paiva | |
| 2021/0281682 A1 | 9/2021 | Agarwal | |

(Continued)

OTHER PUBLICATIONS

Chmiel, "Human Digital Twins. What Are They and Why Are They?", Avenga, Oct. 6, 2020, 12 Pages. https://www.avenga.com/magazine/human-digital-twins/.

(Continued)

*Primary Examiner* — Simon King
(74) *Attorney, Agent, or Firm* — Rakesh Roy (57) ABSTRACT

An embodiment for simulating an interactive voice response system (IVRS) call with a digital twin agent of a user is provided. The embodiment may include receiving data relating to characteristics of the user, activities of the user, and historical data relating to one or more prior IVRS dialogs. The embodiment may also include creating a digital twin agent of the user. The embodiment may further include identifying one or more preferences of the user from the historical data. The embodiment may also include in response to determining the user is occupied, identifying a context of an issue requiring an IVRS call. The embodiment may further include initiating the IVRS call with the digital twin agent representing the user. The embodiment may also include transcribing an IVRS script and interacting with the IVRS in accordance with the IVRS script and the one or more preferences of the user.

20 Claims, 7 Drawing Sheets

(56) References Cited

U.S. PATENT DOCUMENTS

| | | | | |
|---|---|---|---|---|
| 2021/0409542 A1* | 12/2021 | Chavez | ................ | H04L 51/02 |
| 2022/0138296 A1* | 5/2022 | Kwatra | ................ | G10L 15/28 |
| | | | | 704/232 |
| 2022/0366150 A1* | 11/2022 | Olson | ................ | G06F 40/51 |

OTHER PUBLICATIONS

Disclosed Anonymously, "Automated IVR Response Using Cookies", IPCOM000266804D, Aug. 24, 2021, 4 Pages. https://ip.com/IPCOM/000266804.

Disclosed Anonymously, "Virtual Reality System That Uses Digital Twins to Visualize an Individual's Level of Adaptability", IPCOM000261908D, Apr. 16, 2020, 3 Pages. https://ip.com/IPCOM/000261908.

Mell et al., "The NIST Definition of Cloud Computing", Recommendations of the National Institute of Standards and Technology, NIST Special Publication 800-145, Sep. 2011, 7 pages.

Decarlo, "18 Common IVR Mistakes & How to Configure Effective IVR", GetVoip, Jun. 13, 2019, 14 Pages. https://getvoip.com/blog/2019/06/13/ivr-mistakes/#most-common-ivr-mistakes-companies-make.

Christenson, "Solutions to Common Interactive Voice Response (IVR) Problems", TCN, Aug. 17, 2020, 5 Pages. https://www.tcn.com/solutions-to-common-interactive-voice-response-ivr-problems/.

Mead, "11 Problems With IVR Systems (and how to solve them)", Inform Communications, Retrieved from the Internet Mar. 22, 2022, 23 Pages. https://www.inform-comms.com/ivr-system-problems/.

Telzio, "Small Business Phone System with Big Features", Accessed on Mar. 22, 2022, 3 Pages. https://telzio.com/small-business.

\* cited by examiner

DIGITAL TWIN SIMULATION OF INTERACTIVE VOICE RESPONSE SYSTEM CALL

BACKGROUND

The present invention relates generally to the field of computing, and more particularly to a system for simulating an interactive voice response system (IVRS) call with a digital twin agent of a user.

Many companies are using IVRSs, which are automated versions of customer service representatives, to greet callers and give options to route calls to a desired destination. In some cases, the desired destination may be a live human (e.g., a customer service representative), while in other cases the desired destination may be a frequently asked question (FAQ) menu where the caller can seek answers to a question. These IVRSs may operate 24 hours a day and may serve to alleviate contact center traffic and properly allocate incoming calls. Such incoming calls may be allocated by IVRSs via touch-tone and/or speech recognition technology to handle requests of the callers. In addition, many voice over internet protocol (VoIP) telephones used by companies include IVRS software on the VoIP platform.

SUMMARY

According to one embodiment, a method, computer system, and computer program product for simulating an interactive voice response system (IVRS) call with a digital twin agent of a user is provided. The embodiment may include receiving data relating to characteristics of the user, activities of the user, and historical data relating to one or more prior IVRS dialogs. The embodiment may also include creating a digital twin agent of the user based on the characteristics of the user and the historical data. The embodiment may further include identifying one or more preferences of the user from the historical data. The embodiment may also include in response to determining the user is occupied, identifying a context of an issue requiring an IVRS call associated with an IVRS based on data from one or more internet of things (IoT) devices. The embodiment may further include initiating the IVRS call with the digital twin agent representing the user. The embodiment may also include transcribing an IVRS script and interacting with the IVRS, via the digital twin agent, in accordance with the IVRS script and the one or more preferences of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for simulating an interactive voice response system (IVRS) call with a digital twin agent of a user. The following described exemplary embodiments provide a system, method, and program product to, among other things, create a digital twin agent of the user and, accordingly, initiate an IVRS call with the digital twin agent representing the user in interactions with the IVRS. Therefore, the present embodiment has the capacity to improve IVRS technology by dynamically activating a digital twin agent of the user and using that digital twin agent to interact with the IVRS.

As previously described, many companies are using IVRSs, which are automated versions of customer service representatives, to greet callers and give options to route calls to a desired destination. In some cases, the desired destination may be a live human (e.g., a customer service representative), while in other cases the desired destination may be a frequently asked question (FAQ) menu where the caller can seek answers to a question. These IVRSs may operate 24 hours a day and may serve to alleviate contact center traffic and properly allocate incoming calls. Such incoming calls may be allocated by IVRSs via touch-tone and/or speech recognition technology to handle requests of the callers. In addition, many voice over internet protocol (VoIP) telephones used by companies include IVRS software on the VoIP platform. Typical IVRSs have many complex menu options, a lack of ability to rejoin the call after a call disconnect, as well as slowness in reaching the desired destination. For example, the user (i.e., the caller) may wish to speak to a live human but has to go through many menus in order to do so. This problem is typically addressed by capturing user-selected options during an interaction between the user and the IVRS and automatically using these options during a future IVRS call to automatically move through the menus. However, automatically using these options in a future call fails to consider the context of the current IVRS call, which may be different than the context of the previous IVRS call. Also, some menus may prompt the user for information which has not been captured as historical data. It may therefore be imperative to have a system in place in which the user is able to dynamically activate a digital twin agent of the user and use that digital twin agent to interact with the IVRS. Thus, embodiments of the present invention may provide advantages including, but not limited to, dynamically activating a digital twin agent of the user to initiate an IVRS call and interact with the IVRS, seamlessly switching between the digital twin agent and the user when human intervention is required, and increasing levels of customer satisfaction. The present invention does not require that all advantages need to be incorporated into every embodiment of the invention.

According to at least one embodiment, when a user is interacting with the IVRS, data relating to characteristics of the user, activities of the user, and historical data relating to one or more prior IVRS dialogs may be received in order to create a digital twin agent of the user based on the characteristics of the user and the historical data. Upon creating the digital twin agent, one or more preferences of the user may be identified from the historical data, and in response to determining the user is occupied based on the data relating to the activities of the user, a context of an issue requiring an IVRS call associated with the IVRS may be identified based on data from one or more internet of things (IoT) devices. Upon identifying the context, the IVRS call may be initiated with the digital twin agent representing (i.e., taking the place of) the user such that an IVRS transcript may be transcribed, and such that the digital twin agent may interact with the IVRS in accordance with the IVRS transcript and the one or more preferences of the user. According to at least one embodiment, in response to determining human intervention is required, a response from the user may be forwarded by the digital twin agent to perform the required human intervention, and upon completion of the required human intervention, direct interaction between the digital twin agent and the IVRS may resume.

According to at least one other embodiment, one or more unhandled interactions in the IVRS call may be identified in order to generate feedback for the IVRS based on the one or more unhandled interactions. The generated feedback may then be communicated to the IVRS. In a further embodiment, a corpus of IVRS call communication transcripts may be generated where the corpus contains a transcription of the interaction between the digital twin agent and the IVRS.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a digital twin agent of the user and, accordingly, initiate an IVRS call with the digital twin agent representing the user in interactions with the IVRS.

Figure 1:
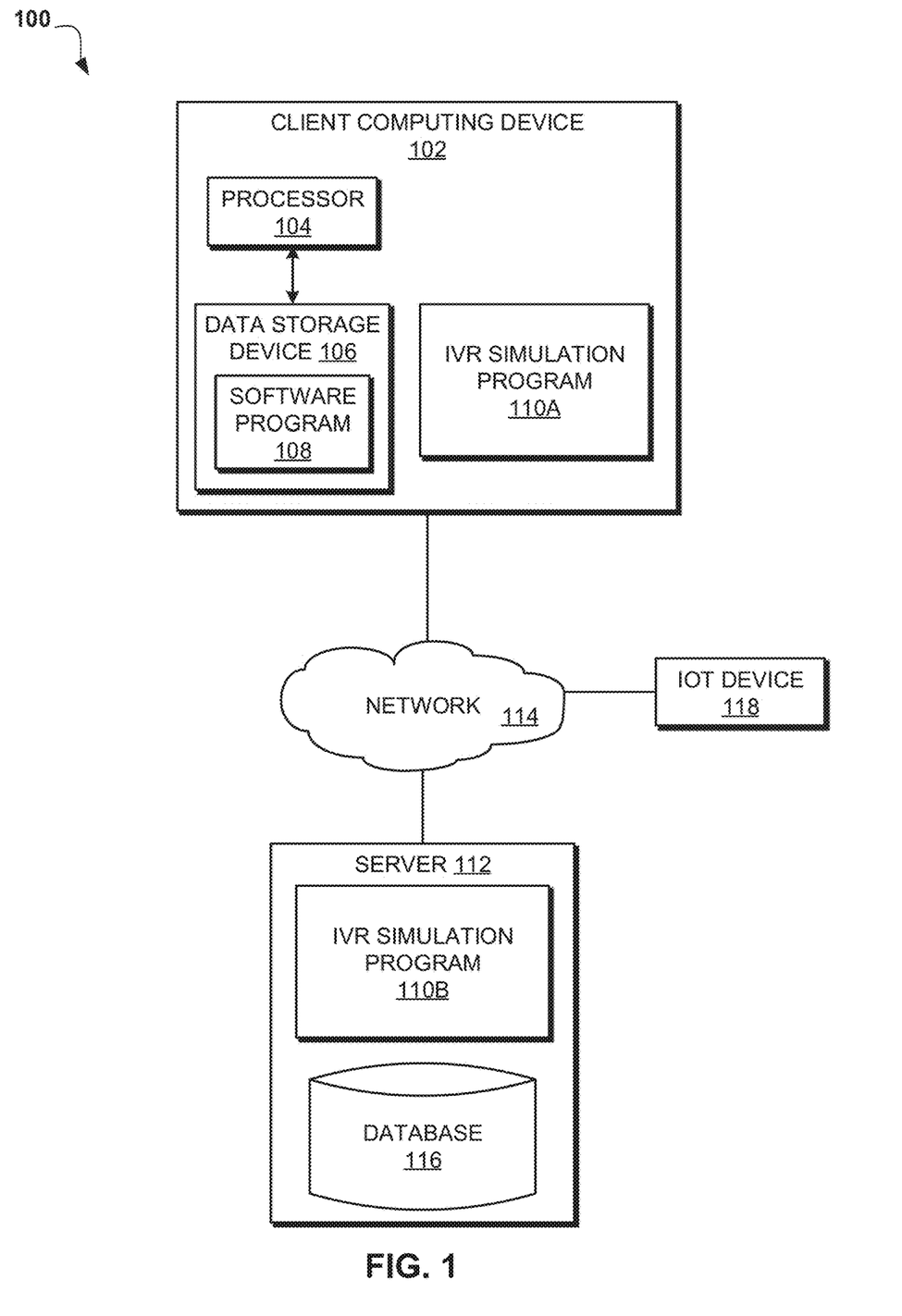
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an interactive voice response (IVR) simulation program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an IVR simulation program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a wearable device (e.g., a smartwatch, AR glasses), IoT sensors in a smart home, a virtual assistant device, and/or any other IoT Device 118 known in the art for gathering information about the user and reporting technical issues that is capable of connecting to the communication network 114, and transmitting and receiving data with the client computing device 102 and the server 112.

According to the present embodiment, the IVR simulation program 110A, 110B may be a program capable of receiving data relating to characteristics of the user, activities of the user, and historical data relating to prior IVRS calls, creating a digital twin agent of the user, initiating an IVRS call with the digital twin agent representing the user in interactions with the IVRS, dynamically activating the digital twin agent of the user when the user is busy, seamlessly switching between the digital twin agent and the user when human intervention is required, and increasing levels of customer satisfaction. The IVR simulation method is explained in further detail below with respect to FIGS. 2A and 2B.

Figure 2A:
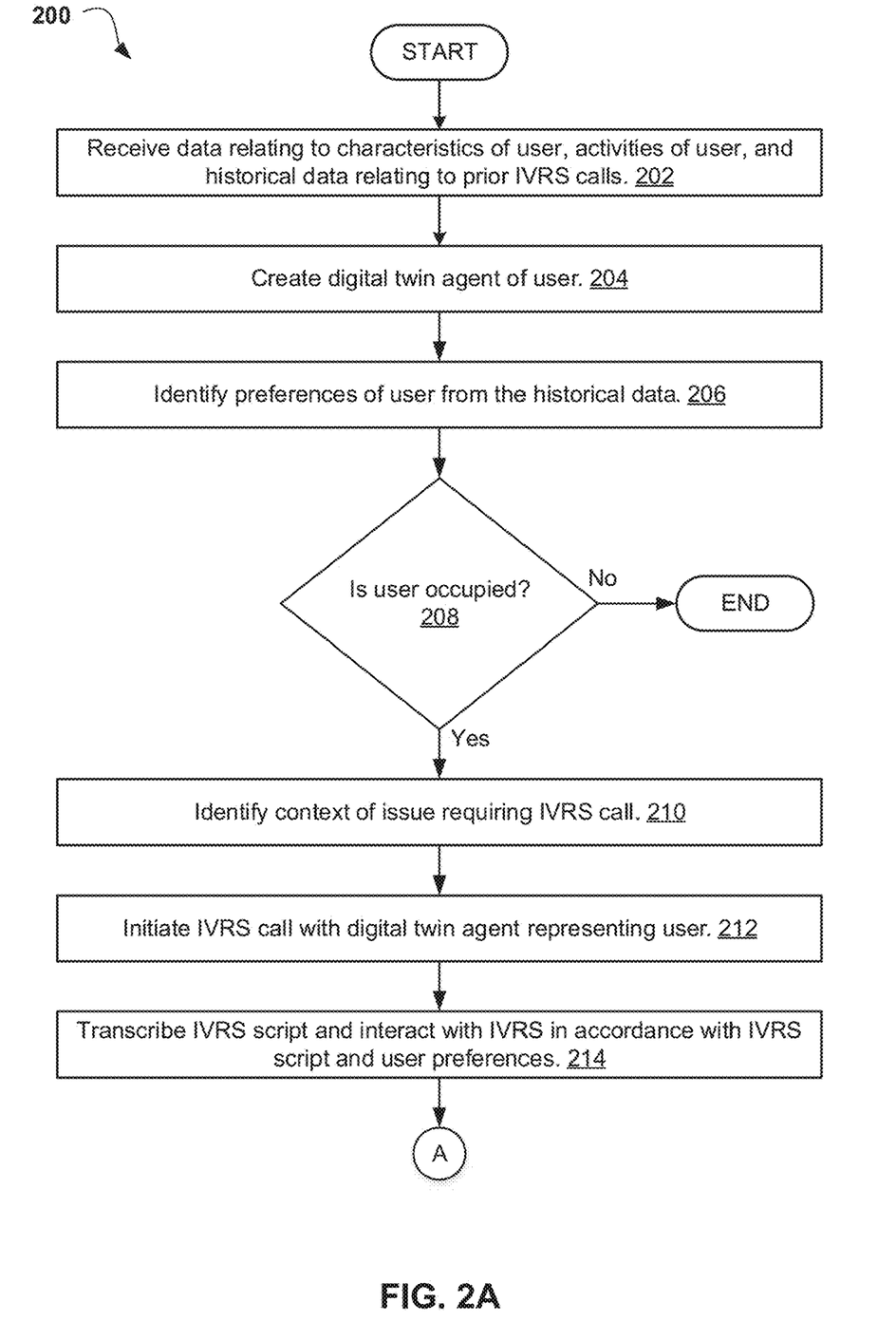
FIGS. 2A and 2B illustrate an operational flowchart for simulating an interactive voice response system (IVRS) call with a digital twin agent of a user in a digital twin agent IVRS call simulation process according to at least one embodiment.
Figure 2B:
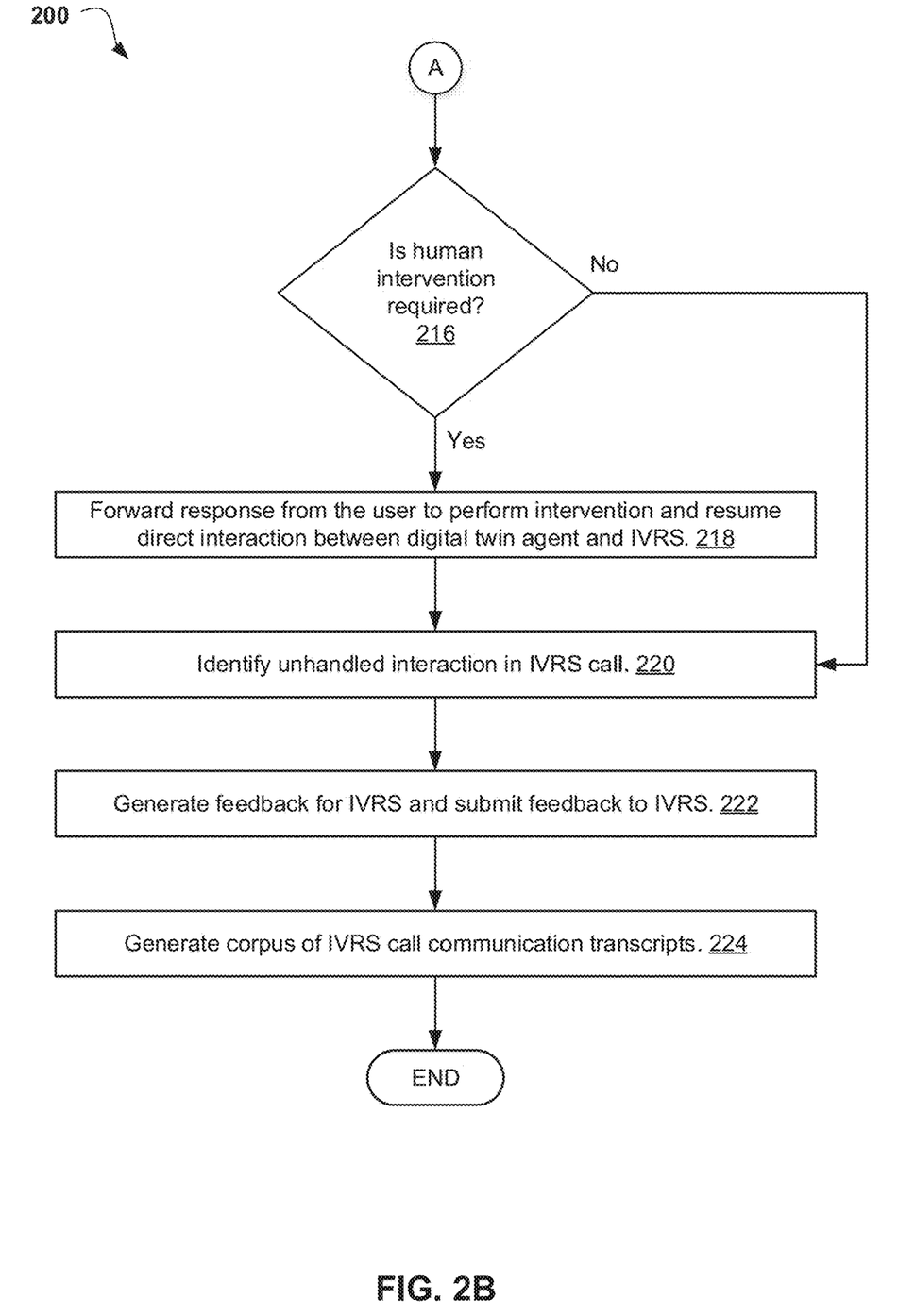

Referring now to FIGS. 2A and 2B, an operational flowchart for simulating an IVRS call with a digital twin agent of a user in a digital twin agent IVRS call simulation process 200 is depicted according to at least one embodiment. At 202, the IVR simulation program 110A, 110B receives the data relating to the characteristics of the user, the activities of the user, and the historical data relating to one or more prior IVRS dialogs. It may be appreciated that as used herein, the IVRS dialog represents an interaction between the user and the IVRS, whereas the IVRS call represents an interaction between the digital agent of the user and the IVRS.

The data relating to the characteristics of the user may include, but is not limited to, physical characteristics (e.g., age, gender, height, hair color, and/or eye color) and social characteristics (e.g., tone of voice and/or daily routines). The characteristics may be obtained by the IVR simulation program 110A, 110B through social media profiles of the user, and/or through manual input by the user via a graphical user interface (GUI). These characteristics of the user may be used to build the digital twin agent of the user, described in further detail below with respect to step 204.

The data relating to the activities of the user may include, but is not limited to, business and social matters in which the user is engaged (e.g., work hours, business meetings, and/or social events). The activities may be obtained by the IVR simulation program 110A, 110B through online calendars of the user, GPS location data of wearable and mobile devices, and/or in-home IoT device sensors detecting no movement in the home. For example, when the in-home IoT sensors detect no movement in the home, the IVR simulation program 110A, 110B may infer the user out of the home performing some task and therefore is unavailable to interact with the IVRS. The activities of the user may be used to determine whether the user is occupied, described in further detail below with respect to step 208.

The historical data relating to the one or more prior IVRS dialogs may include, but is not limited to, metadata from the one or more prior IVRS dialogs, the one or more preferences of the user, described in further detail below with respect to step 206, and a context for each prior IVRS dialog. For example, the prior IVRS dialog may be a dialog between the user and the IVRS, where the IVRS may prompt the user with a question such as, "Are you available on Monday between 4:00 and 5:00 p.m.?" Continuing the example, if the user replies "No," the IVR simulation program 110A, 110B may infer the user is unavailable to interact with the IVRS during those hours. The context may be a reason for conducting the prior IVRS dialog. For example, the user may initiate the IVRS dialog because they are looking to get technical support for a broken appliance. The historical data may also be used to build the digital twin agent of the user, described in further detail below with respect to step 204.

Then, at 204, the IVR simulation program 110A, 110B creates the digital twin agent of the user. The digital twin agent of the user is created based on the characteristics of the user and the historical data described above with respect to step 202. A digital twin of the user may be generated first. The digital twin may be a virtual representation of the user designed to accurately reflect the user. According to at least one embodiment, a digital twin of the user may already exist. For example, the digital twin may have been created during the execution of a different process. In this embodiment, the digital twin may be obtained by the IVR simulation program 110A, 110B from a digital twin library (e.g., a database, such as database 116). According to at least one other embodiment, the digital twin may be built by the IVR simulation program 110A, 110B using known techniques. Similarly, in this embodiment, the digital twin may be built to accurately reflect the user in accordance with the characteristics of the user and the historical data.

In either embodiment, the digital twin agent of the user may be created based on the digital twin. As used herein, the "digital twin agent" is an enhanced version of the digital twin that has knowledge of the context of the issue that triggered the IVRS call and is specifically created to effectively interact with the IVRS in accordance with the one or more preferences of the user. For example, the digital twin agent may navigate through IVRS menus and respond to audio prompts from the IVRS. Details on how the digital twin agent interacts with the IVRS are described in further detail below with respect to step 214.

Next, at 206, the IVR simulation program 110A, 110B identifies the one or more preferences of the user from the historical data. As described above with respect to step 202, the historical data relating to the one or more prior IVRS dialogs may be received by the IVR simulation program 110A, 110B. The one or more preferences of the user may be derived from the historical data. Examples of a preference of the user include, but are not limited to, a mode of interaction preferred by the user (e.g., touch, voice, or gesture), a navigation path through IVRS menus for each specific context, and/or a speed of the user in responding to prompts from the IVRS. For example, during a prior IVRS dialog, the IVRS may prompt the user, "To contact sales, press or say one, for support, press or say two, and to speak to a representative, press or say 3." Then the user may either press a button on their keypad or verbally speak a number. If the user interacts via pressing the button, the IVR simulation program 110A, 110B may identify the preference as touch. Alternatively, if the user interacts by verbally speaking the number, the IVR simulation program 110A, 110B may identify the preference as voice.

In another example, the user may move quickly through the IVRS menus, in which there is almost no time lag between the IVRS finishing the prompt and the user response. In this example, the IVR simulation program 110A, 110B may identify that the user prefers a fast interaction with the IVRS. Alternatively, the user may move slowly through the IVRS menus, in which several seconds elapse between the IVRS finishing the prompt and the user response. In this example, the IVR simulation program 110A, 110B may identify that the user prefers a slow interaction with the IVRS.

In yet another example, the user may move through a particular navigation path for each specific context. Continuing the example, when the context of the prior IVRS dialog is technical support for a broken refrigerator, the navigation path of the user may be: 1>3>2<2<1, where the numbers represent voice or touch input by the user in response to prompts from the IVRS menus. Thus, during a future call between the digital twin agent and the IVRS for the same context, the digital twin agent may follow the same navigation path (i.e., 1>3>2<2<1).

Then, at 208, the IVR simulation program 110A, 110B determines whether the user is occupied. The determination is made based on the data relating to the activities of the user. As described above with respect to step 202, the activities may be obtained by the IVR simulation program 110A, 110B through online calendars of the user, GPS location data of wearable and mobile devices, and/or in-home IoT device sensors detecting no movement in the home. For example, when the in-home IoT sensors detect no movement in the home, the IVR simulation program 110A, 110B may infer the user out of the home performing some task and therefore is unavailable to interact with the IVRS. Similarly, a smartwatch of the user may detect the user is currently at a supermarket, and therefore is unavailable to interact with the IVRS. In another example, the online calendar of the user may indicate the user is in a meeting on Thursday between 10:00 a.m. and 12:00 p.m., and therefore is unavailable to interact with the IVRS during those hours.

According to at least one other embodiment, the determination may also be made based on the metadata from the one or more prior IVRS dialogs. For example, as described above with respect to step 202, the prior IVRS dialog may be a dialog between the user and the IVRS, where the IVRS may prompt the user with a question such as, "Are you available on Monday between 4:00 and 5:00 p.m.?" Continuing the example, if the user replies "No," the IVR simulation program 110A, 110B may infer the user is unavailable to interact with the IVRS during those hours.

According to at least one further embodiment, the determination may also be made based on manual input from the user. For example, the user may not be engaged in a business or social matter outside of their home, but may nevertheless want their digital twin agent to interact with the IVRS anyway. In this embodiment, the user may update their status as "occupied" via the GUI.

In response to determining the user is occupied (step 208, "Yes" branch), the digital twin agent IVRS call simulation process 200 proceeds to step 210 to identify the context of the issue requiring the IVRS call. In response to determining the user is not occupied (step 208, "No" branch), the digital twin agent IVRS call simulation process 200 ends, since the user would like to interact with the IVRS without the digital twin agent.

Next, at 210, the IVR simulation program 110A, 110B identifies the context of the issue requiring the IVRS call associated with the IVRS. The context is identified based on the data from the one or more IoT devices 118. The context may be a reason for conducting the IVRS call. For example, a smart-home appliance may be broken (i.e., non-functional) or may be slow in responding to a command from the user (e.g., due to a software issue). Some IoT devices 118 are able to run diagnostics and self-identify problems. IoT devices 118 having this capability may transmit the data directly to the IVR simulation program 110A, 110B via inter-process communication. For example, a robotic vacuum cleaner may transmit data that there is no suction to pick up debris. For IoT devices 118 that are unable to self-identify problems, the user may manually enter the issue into the GUI of their device, which may then be transmitted to the IVR simulation program 110A, 110B.

Then, at 212, the IVR simulation program 110A, 110B initiates the IVRS call with the digital twin agent representing the user. As used herein, "representing the user" means the digital twin agent takes the place of the user during the IVRS call, and the digital twin agent interacts with the IVRS, described in further detail below with respect to step 214. The IVR simulation program 110A, 110B, upon identifying the context of the issue requiring the IVRS call, may utilize IVRS profiling and online resources to identify the customer care or support number of the appropriate IVRS. For example, the data transmitted by the IoT devices 118 may include the manufacturer of the product associated with the issue. Thus, the customer care or support number may be the call number of the IVRS for that particular manufacturer. Alternatively, the user may manually enter the appropriate customer care or support number into the GUI so that the IVR simulation program 110A, 110B may initiate the IVRS call.

Next, at 214, the IVR simulation program 110A, 110B transcribes the IVRS script and interacts with the IVRS via the digital twin agent. The digital twin agent interacts with the IVRS in accordance with the IVRS script and the one or more preferences of the user.

The IVRS script may refer to the IVRS greetings and menu prompts the IVRS issues when interacting with the digital twin agent. The IVRS script may include a prompt which causes the IVRS to issue a command and/or ask a question. For example, the command may be, "To contact sales, press or say one, for support, press or say two, and to speak to a representative, press or say 3." In another example, the question may be, "What is your name?" According to at least one embodiment, the IVRS script may be stored in an IVRS corpus. The IVR simulation program 110A, 110B may access this corpus and transcribe the IVRS script. In this manner, the digital twin agent may have firsthand knowledge of the IVRS script and be better prepared to respond to the prompts.

The digital twin agent may then interact with the IVRS in accordance with the IVRS script and the one or more preferences of the user. As described above with respect to step 206, examples of a preferences of the user include, but are not limited to, a mode of interaction preferred by the user (e.g., touch, voice, or gesture), a navigation path through IVRS menus for each specific context, and/or a speed of the user in responding to prompts from the IVRS. For example, during the IVRS call, the IVRS may prompt the digital twin agent, "To contact sales, press or say one, for support, press or say two, and to speak to a representative, press or say 3." Then the digital twin agent may either press a button on their keypad or verbally speak a number. If the historical data indicates the user interacts via pressing the button, the digital twin agent may also press the button. Alternatively, if the historical data indicates the user interacts by verbally speaking the number, the digital twin agent may also speak the number. In situations where the context of the prior IVRS dialog match the context of the issue requiring the IVRS call, the digital twin agent may follow the same navigation path. For example, if the robotic vacuum cleaner losing suction was the context of the prior IVRS dialog, then if that same robotic vacuum cleaner encounters the same issue in the future, the digital twin agent may follow the navigation path that the user followed during the prior IVRS dialog.

In addition to command prompts, the IVRS may prompt the digital twin agent with one or more questions. Continuing the example above, the IVRS prompt may be, "What is your name?" According to at least one embodiment, the digital twin agent may obtain the answer from the metadata of the one or more prior IVRS dialogs. For example, the user response to a question in the prior IVRS dialog may be, "My name is Alex." This response may be included as metadata. Thus, in this example, the digital twin agent of Alex during the IVRS call may respond with, "My name is Alex." According to at least one other embodiment, the digital twin agent may obtain the answer from an online profile of the user, such as a social media profile, and/or a database storing user information, such as database 116. According to at least one further embodiment, when the digital twin agent is unable to answer the question, the digital twin agent may obtain the answer directly from the user, described in further detail below with respect to step 216.

Then, at 216, the IVR simulation program 110A, 110B determines whether the human intervention is required. According to at least one embodiment, the human intervention may be required when the digital twin agent cannot find an answer to a question from the IVRS. For example, there may be no adequate answer in the metadata of the one or more prior IVRS dialogs, and there may be no adequate answer in the online profile or database. In this embodiment, the digital twin agent may notify the user that the digital twin agent requires an answer from the user. The user may supply the answer to the digital twin agent, which may then forward the answer to the IVRS to perform the required human intervention.

According to at least one other embodiment, the human intervention may be required when the digital twin agent does not meet an access level threshold for accessing a piece of information about the user. Each piece of information about the user that is requested by the IVRS may be associated with an access level. The access level may indicate sensitivity of the information and may be a number on a range (e.g., 1-5), with "1" indicating lowest sensitivity and "5" indicating highest sensitivity. Thus, a higher number indicates a higher level of sensitivity. Examples of sensitive information include, but are not limited to, passwords, credit card numbers, addresses, phone numbers, dates of birth, and/or ID numbers. The access level may be set automatically by the IVR simulation program 110A, 110B based on the type of information, and may be customized by the user. For example, the access level for a password or credit card number may be "5," whereas the access level for a phone number may be "1." In addition, the user may set the access level threshold for the digital twin agent. For example, if the user sets the access level threshold for the digital twin agent to "3," the digital twin agent may have access to user information having an access level of "3" or lower. In another example, if the user sets the access level threshold for the digital twin agent to "5," the digital twin agent may have access to any user information.

In response to determining the human intervention is required (step 216, "Yes" branch), the digital twin agent IVRS call simulation process 200 proceeds to step 218 to forward the response from the user to perform the required human intervention. In response to determining the human intervention is not required (step 216, "No" branch), the digital twin agent IVRS call simulation process 200 proceeds to step 220 to identify the unhandled interaction in the IVRS call.

Next, at 218, the IVR simulation program 110A, 110B forwards the response from the user to perform the required human intervention. The response is forwarded by the digital twin agent. As described above with respect to step 216, the digital twin agent may notify the user that the human intervention is required. The notification may be a push notification on the device of the user. The user may supply the answer, which may be obtained by the digital twin agent. The user may supply the answer using touch, voice, or making a gesture. For example, when the required human intervention is biometrics of the user, the user may place their finger on the screen of their device to obtain a fingerprint. In another example, if the user is wearing augmented reality (AR) glasses, the user may supply the answer by making the gesture (e.g., blinking once for "yes" and twice for "no"). The obtained response from the user may then be relayed to the IVRS. In this manner, the user does not have to actively join the IVRS call. Upon the completion of the required human intervention, the direct interaction between the digital twin agent and the IVRS may resume.

The human intervention may be included as metadata. For example, when the digital twin agent cannot find an answer to a question from the IVRS, and when the user supplies the answer, this answer may be included as metadata to be used on a future IVRS call.

Then, at 220, the IVR simulation program 110A, 110B identifies the one or more unhandled interactions in the IVRS call. The unhandled interaction may be any communication failure during the IVRS call. For example, the digital twin agent may respond to a prompt from the IVRS, but the response may be incorrectly recorded, such as when the digital twin agent responds with "yes," but the IVRS treats the response as "no." In another example, the digital twin agent may not be able to respond to a prompt from the IVRS because the prompt may not be articulated clearly, such as due to the presence of static during the IVRS call. Whenever there is any communication failure, the IVR simulation program 110A, 110B may perform root cause analysis to identify the reason for the communication failure, such as a network issue or dropped IVRS call.

Next, at 222, the IVR simulation program 110A, 110B generates the feedback for the IVRS. The generated feedback is then communicated to the IVRS. The generated feedback may notify the IVRS about the reason for the communication failure, such as the network issue or dropped IVRS call. The generated feedback may be communicated in real-time, and when the communication failure can be automatically resolved, either by the digital twin agent or the IVRS itself, the digital twin agent may repeat the interaction which resulted in the communication failure.

Then, at 224, the IVR simulation program 110A, 110B generates the corpus of IVRS call communication transcripts. The corpus contains the transcription of the interaction between the digital twin agent and the IVRS. For each IVRS call between the digital twin agent and the IVRS, the contents of the interaction are transcribed (i.e., each prompt from the IVRS and each response from the digital twin agent, including forwarded user responses are transcribed). The IVR simulation program 110A, 110B may execute de-identification on each IVRS call communication transcript to remove personal and sensitive information about the user. The de-identified transcripts may be used to generate a transfer learning model so that the digital twin agent of another user can leverage pre-existing data in interacting with an IVRS for a similar issue.

Figure 3:
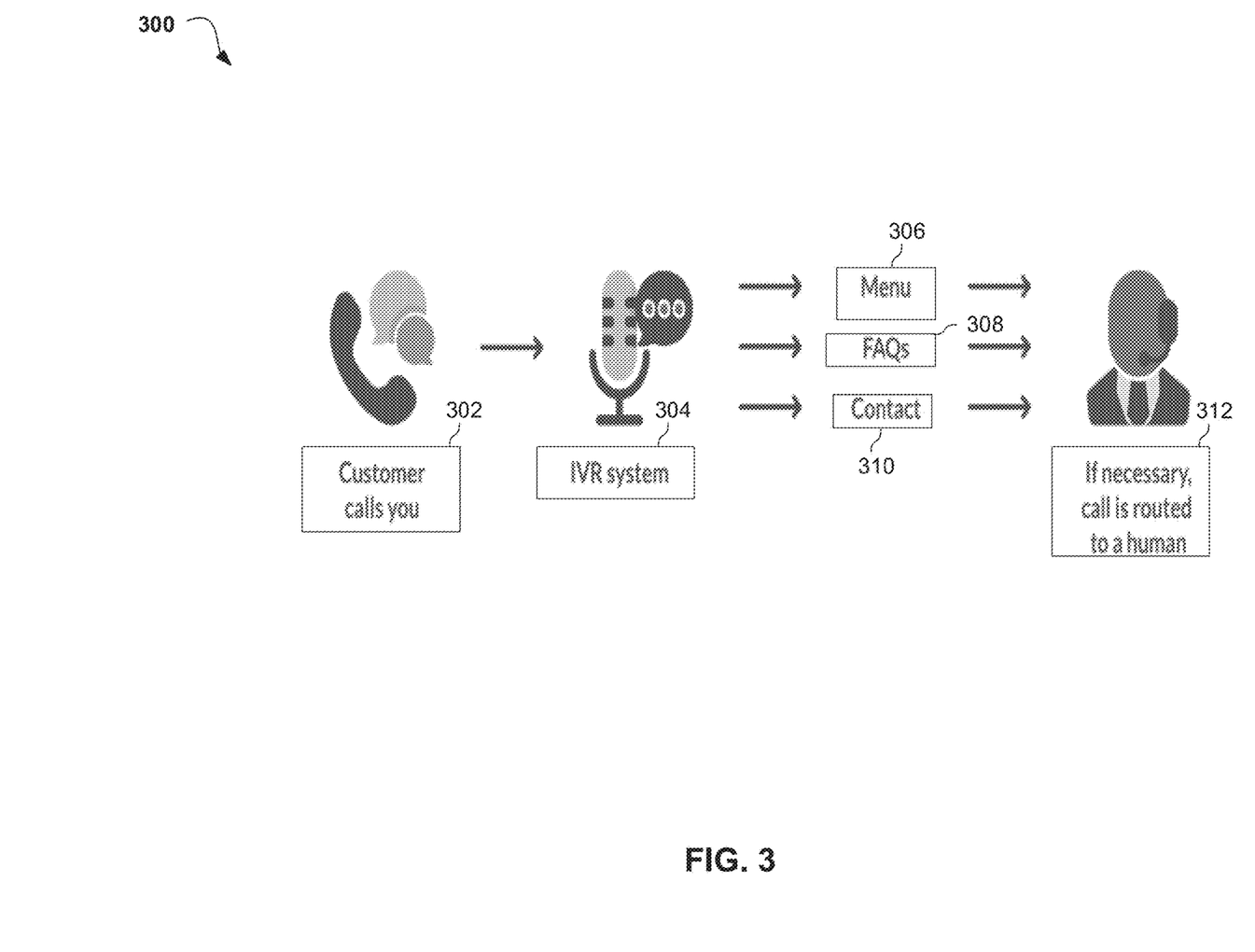
FIG. 3 is an exemplary diagram depicting how a telephone call moves through the IVRS according to at least one embodiment.

Referring now to FIG. 3, an exemplary diagram depicting how a telephone call moves through the IVRS is shown according to at least one embodiment. In the diagram 300, the customer (i.e., the digital twin agent of the user) may make a call 302 to a desired party. For example, the desired party may be the customer service department of a particular company. The IVRS 304 may greet the customer with a pre-recorded voice menu 306. The pre-recorded voice menu 306 may prompt the caller with a series of frequently asked questions (FAQs) 308 that are spoken to every caller who interacts with the IVRS. The pre-recorded voice menu 306, after gathering the requisite information from the caller, may present the caller with a variety of contact options 310. These contact options 310 may include, but are not limited to, a sales department, a service department, and/or a technical support department. Based on the selection of the caller, the call 302 may be routed to a human 312 if necessary.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
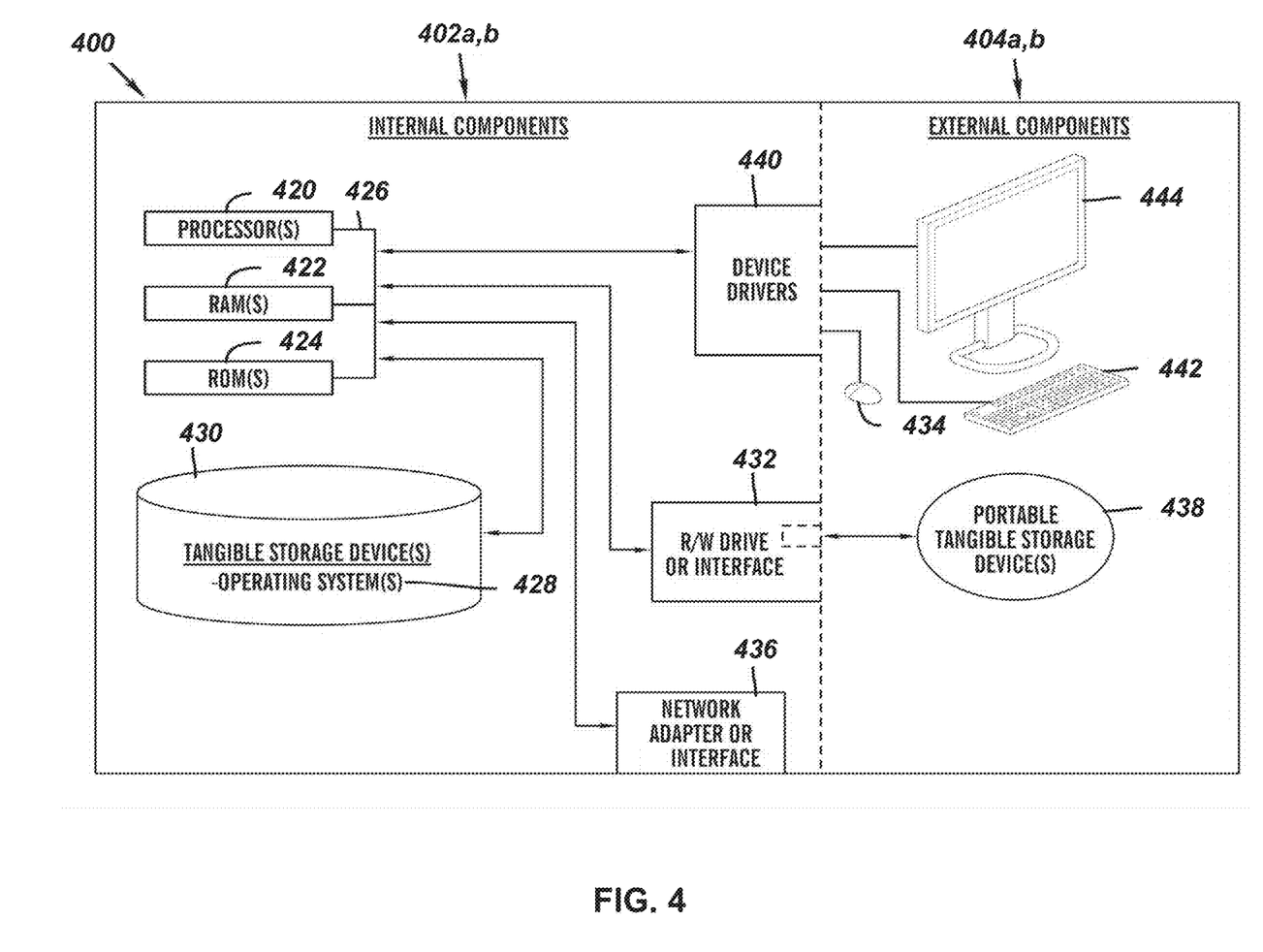
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the IVR simulation program 110A in the client computing device 102 and the IVR simulation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the IVR simulation program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the IVR simulation program 110A in the client computing device 102 and the IVR simulation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the IVR simulation program 110A in the client computing device 102 and the IVR simulation program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
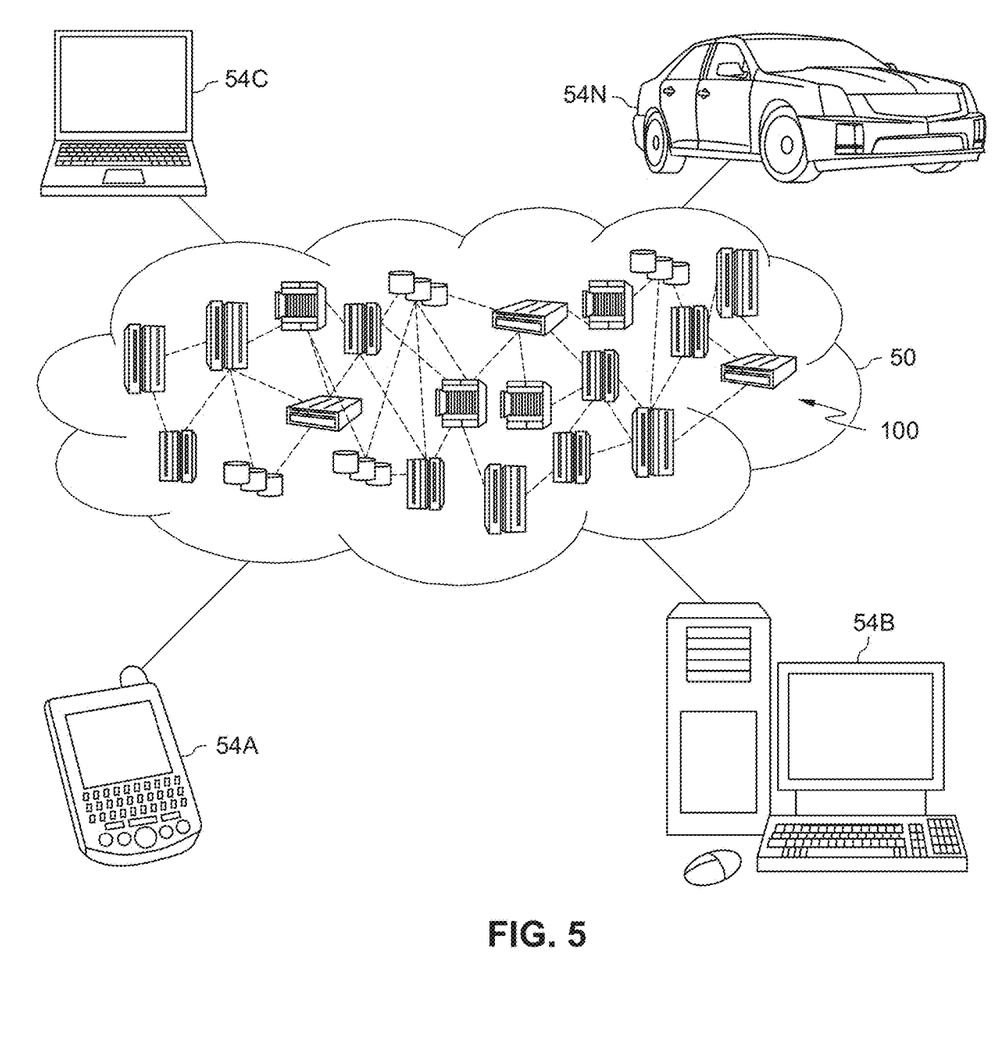
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
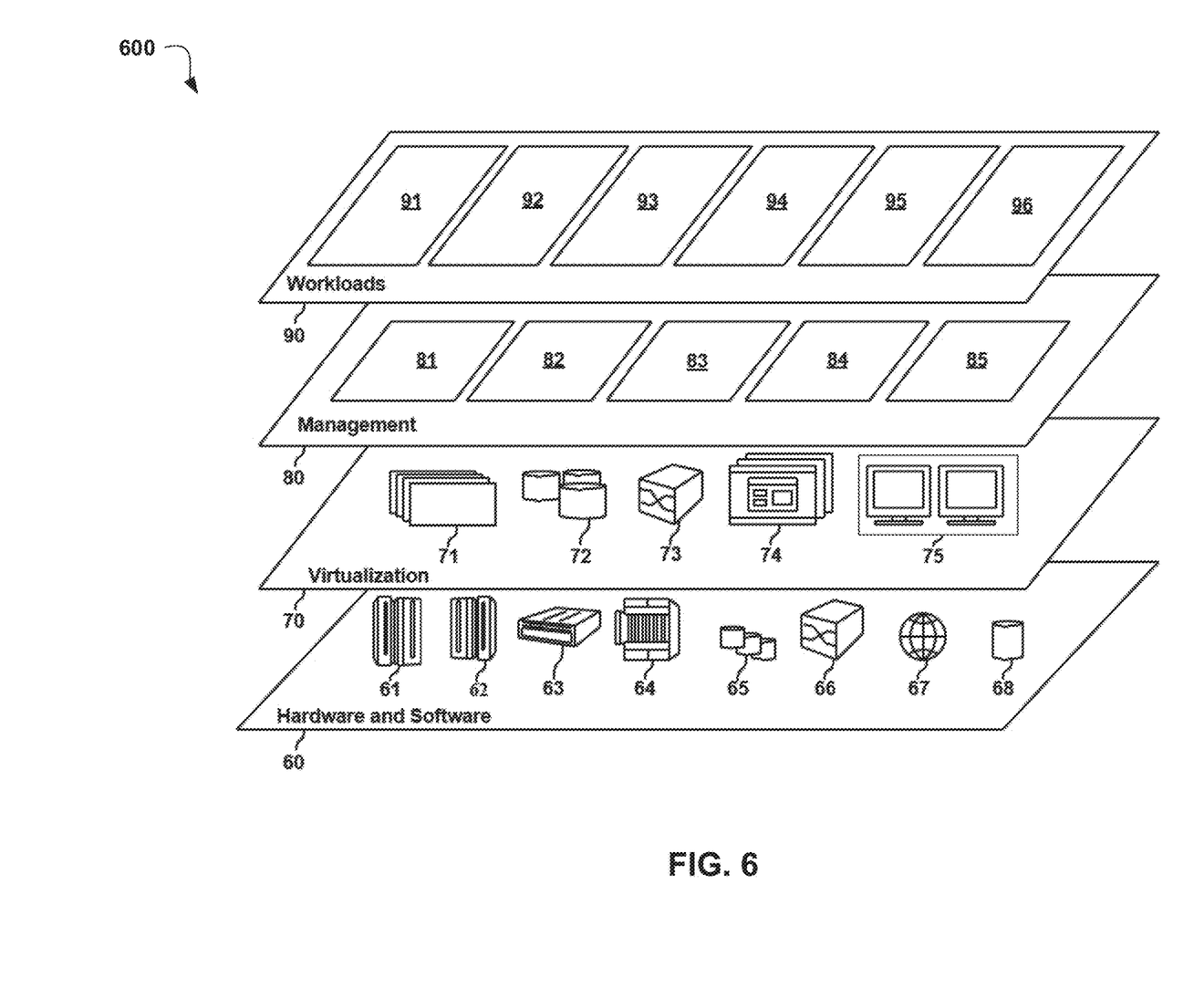
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and simulating an IVRS call with a digital twin agent of a user 96. Simulating an IVRS call with a digital twin agent of a user 96 may relate to creating a digital twin agent of the user in order to initiate an IVRS call with the digital twin agent representing the user in interactions with the IVRS.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of simulating an interactive voice response system (IVRS) call with a digital twin agent of a user, the method comprising:
   receiving data relating to characteristics of the user, activities of the user, and historical data relating to one or more prior IVRS dialogs;
   creating a digital twin agent of the user based on the characteristics of the user and the historical data;
   identifying one or more preferences of the user from the historical data;
   determining whether the user is occupied based on the data relating to the activities of the user;

in response to determining the user is occupied, identifying a context of an issue requiring an IVRS call associated with an IVRS based on data from one or more internet of things (IOT) devices; and
initiating the IVRS call with the digital twin agent representing the user.

2. The computer-based method of claim 1, further comprising:
determining whether human intervention is required;
in response to determining the human intervention is required, forwarding a response from the user, by the digital twin agent, to perform the required human intervention; and
upon completion of the required human intervention, resuming direct interaction between the digital twin agent and the IVRS.

3. The computer-based method of claim 2, wherein the human intervention is required when the digital twin agent does not meet an access level threshold for accessing a piece of information about the user.

4. The computer-based method of claim 2, wherein forwarding the response from the user further comprises:
notifying, by the digital twin agent, the user that the human intervention is required;
obtaining the response from the user; and
relaying the response from the user to the IVRS.

5. The computer-based method of claim 2, further comprising:
identifying one or more unhandled interactions in the IVRS call;
generating feedback for the IVRS based on the one or more unhandled interactions; and
communicating the generated feedback to the IVRS.

6. The computer-based method of claim 2, further comprising:
generating a corpus of IVRS call communication transcripts containing a transcription of the interaction between the digital twin agent and the IVRS.

7. The computer-based method of claim 1, further comprising:
transcribing an IVRS script and interacting with the IVRS, via the digital twin agent, in accordance with the IVRS script and the one or more preferences of the user.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving data relating to characteristics of the user, activities of the user, and historical data relating to one or more prior interactive voice response system (IVRS) dialogs;
creating a digital twin agent of the user based on the characteristics of the user and the historical data;
identifying one or more preferences of the user from the historical data;
determining whether the user is occupied based on the data relating to the activities of the user;
in response to determining the user is occupied, identifying a context of an issue requiring an IVRS call associated with an IVRS based on data from one or more internet of things (IOT) devices; and
initiating the IVRS call with the digital twin agent representing the user.

9. The computer system of claim 8, the method further comprising:
determining whether human intervention is required;
in response to determining the human intervention is required, forwarding a response from the user, by the digital twin agent, to perform the required human intervention; and
upon completion of the required human intervention, resuming direct interaction between the digital twin agent and the IVRS.

10. The computer system of claim 9, wherein the human intervention is required when the digital twin agent does not meet an access level threshold for accessing a piece of information about the user.

11. The computer system of claim 9, wherein forwarding the response from the user further comprises:
notifying, by the digital twin agent, the user that the human intervention is required;
obtaining the response from the user; and
relaying the response from the user to the IVRS.

12. The computer system of claim 9, the method further comprising:
identifying one or more unhandled interactions in the IVRS call;
generating feedback for the IVRS based on the one or more unhandled interactions; and
communicating the generated feedback to the IVRS.

13. The computer system of claim 9, the method further comprising:
generating a corpus of IVRS call communication transcripts containing a transcription of the interaction between the digital twin agent and the IVRS.

14. The computer system of claim 8, the method further comprising:
transcribing an IVRS script and interacting with the IVRS, via the digital twin agent, in accordance with the IVRS script and the one or more preferences of the user.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving data relating to characteristics of the user, activities of the user, and historical data relating to one or more prior interactive voice response system (IVRS) dialogs;
creating a digital twin agent of the user based on the characteristics of the user and the historical data;
identifying one or more preferences of the user from the historical data;
determining whether the user is occupied based on the data relating to the activities of the user;
in response to determining the user is occupied, identifying a context of an issue requiring an IVRS call associated with an IVRS based on data from one or more internet of things (IOT) devices; and
initiating the IVRS call with the digital twin agent representing the user.

16. The computer program product of claim 15, the method further comprising:
determining whether human intervention is required;

in response to determining the human intervention is required, forwarding a response from the user, by the digital twin agent, to perform the required human intervention; and upon completion of the required human intervention, resuming direct interaction between the digital twin agent and the IVRS.

17. The computer program product of claim 16, wherein the human intervention is required when the digital twin agent does not meet an access level threshold for accessing a piece of information about the user.

18. The computer program product of claim 16, wherein forwarding the response from the user further comprises:
notifying, by the digital twin agent, the user that the human intervention is required;
obtaining the response from the user; and
relaying the response from the user to the IVRS.

19. The computer program product of claim 16, the method further comprising:
identifying one or more unhandled interactions in the IVRS call;
generating feedback for the IVRS based on the one or more unhandled interactions; and
communicating the generated feedback to the IVRS.

20. The computer program product of claim 16, the method further comprising:
generating a corpus of IVRS call communication transcripts containing a transcription of the interaction between the digital twin agent and the IVRS.

\* \* \* \* \*